(12) United States Patent
Graeve et al.

(10) Patent No.: US 9,309,943 B2
(45) Date of Patent: Apr. 12, 2016

(54) PENDULUM MOUNT

(75) Inventors: Arndt Graeve, Koblenz (DE); Manfred Hofmann, Hünfelden (DE)

(73) Assignee: Trelleborg Automotive Germany GmbH, Hoehr-Grenzhausen (DE)

( * ) Notice: Subject to any disclaimer, the term of this patent is extended or adjusted under 35 U.S.C. 154(b) by 2273 days.

(21) Appl. No.: 10/571,020

(22) PCT Filed: Sep. 2, 2004

(86) PCT No.: PCT/EP2004/051996
§ 371 (c)(1),
(2), (4) Date: May 9, 2006

(87) PCT Pub. No.: WO2005/025909
PCT Pub. Date: Mar. 24, 2005

(65) Prior Publication Data
US 2007/0028473 A1 Feb. 8, 2007

(30) Foreign Application Priority Data

Sep. 8, 2003 (DE) .................................. 103 42 032

(51) Int. Cl.
| | |
|---|---|
| F16F 7/00 | (2006.01) |
| F16F 1/50 | (2006.01) |
| F16C 7/04 | (2006.01) |
| F16F 3/093 | (2006.01) |
| F16F 1/36 | (2006.01) |
| B60K 5/12 | (2006.01) |

(52) U.S. Cl.
CPC ... *F16F 1/50* (2013.01); *F16C 7/04* (2013.01); *F16F 3/093* (2013.01); *B60G 2202/1422* (2013.01); *B60G 2204/45* (2013.01); *B60G 2206/1114* (2013.01); *B60K 5/1241* (2013.01)

(58) Field of Classification Search
CPC ............... F16F 1/50; F16F 3/093; F16C 7/04; B60G 2202/1422; B60G 2204/45; B60G 2206/1114; B60K 5/1241
USPC ........... 267/136, 140, 141, 141.1, 141.4, 151, 267/152, 153, 292, 140.11; 248/573, 636
See application file for complete search history.

(56) References Cited

U.S. PATENT DOCUMENTS

| | | | | |
|---|---|---|---|---|
| 4,010,773 | A | * | 3/1977 | Bihlmaier ........................ 138/30 |
| 4,406,344 | A | | 9/1983 | Fukushima .................... 180/300 |

(Continued)

FOREIGN PATENT DOCUMENTS

| | | |
|---|---|---|
| DE | 44 41 219 A1 | 5/1996 |
| DE | 196 31 893 A1 | 2/1998 |

(Continued)

*Primary Examiner* — Melody Burch
(74) *Attorney, Agent, or Firm* — Laurence A. Greenberg; Werner H. Stemer; Ralph E. Locher

(57) ABSTRACT

A pendulum support is particularly suited for supporting an engine unit. The support has two mutually spaced-apart fixing elements for connecting two bodies that can be displaced in relation to one another. The fixing elements are elastically interconnected. The object is to provide a pendulum support with a high degree of deflection that is cost-effective to produce. The base body has two base body elements, which are interconnected by at least one elastic shear element. At least one of the base body elements is formed with a cavity, wherein one area of the other base body element is contained with a degree of deflection.

8 Claims, 1 Drawing Sheet

(56) References Cited

U.S. PATENT DOCUMENTS

| | | | | |
|---|---|---|---|---|
| RE32,409 E | * | 4/1987 | Holtgraver | 137/315.22 |
| 4,706,946 A | | 11/1987 | Thorn et al. | 267/292 |
| 4,964,516 A | * | 10/1990 | Thorn | 267/140.11 |
| 5,000,428 A | * | 3/1991 | Thorn | 267/140.11 |
| 5,364,061 A | * | 11/1994 | Ciolczyk et al. | 248/610 |
| 5,645,075 A | * | 7/1997 | Palmer et al. | 600/562 |
| 5,720,833 A | | 2/1998 | Grube et al. | 156/73.1 |
| 6,113,058 A | * | 9/2000 | Iwasaki | 248/678 |

FOREIGN PATENT DOCUMENTS

| | | |
|---|---|---|
| EP | 0 430 620 A1 | 6/1991 |
| EP | 0 849 491 A2 | 6/1998 |
| FR | 1.563.989 | 4/1969 |
| FR | 2.111.845 | 6/1972 |
| FR | 2 703 414 | 10/1994 |
| GB | 506958 | 6/1939 |
| GB | 1 371 774 | 10/1974 |
| JP | 425639 A * | 1/1992 |

* cited by examiner

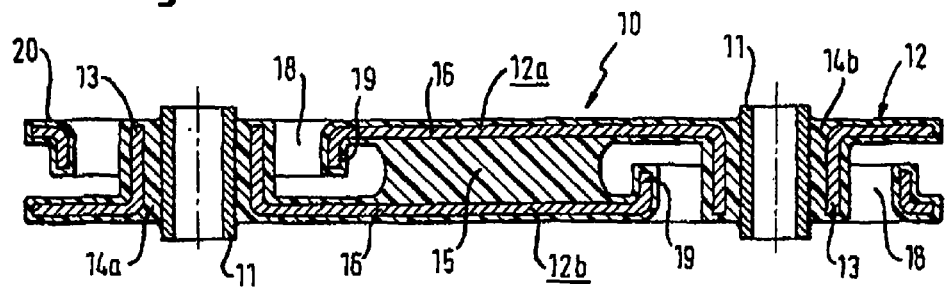
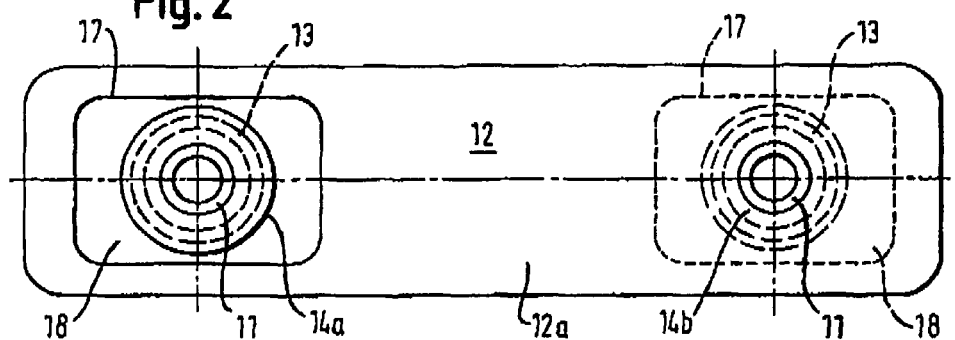
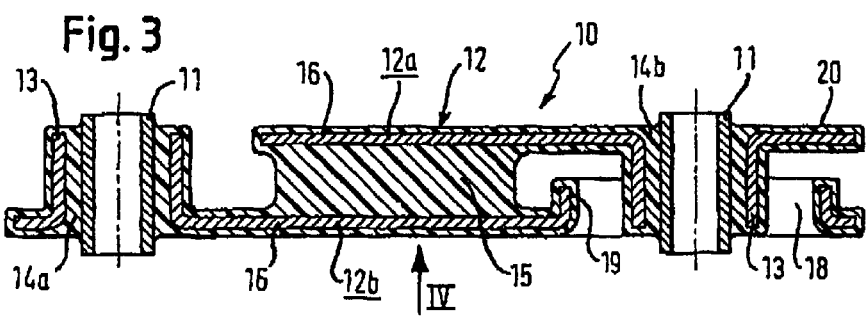
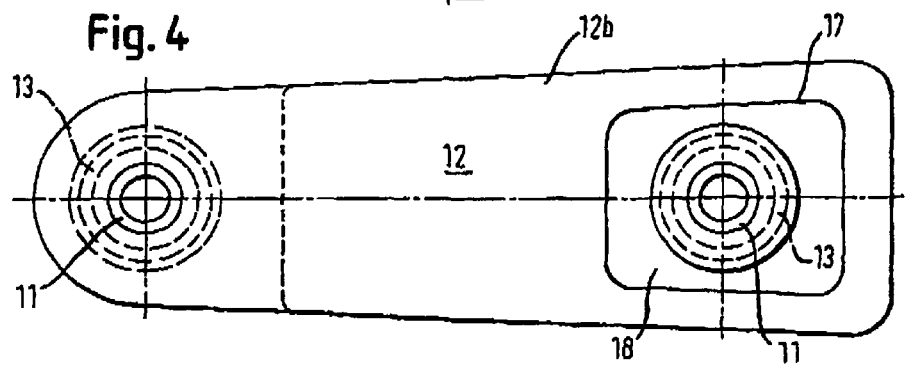

PENDULUM MOUNT

BACKGROUND OF THE INVENTION

Field of the Invention

The invention relates to a pendulum mount, particularly for mounting an engine assembly, comprising two securing means each spaced away from the other for joining two bodies each movable relative to the other, the securing means being interconnected elastically.

Pendulum mounts find application particularly as torque mounts handling the forces transmitted by the engine at at least one point in the engine mounting system. Such pendulum mounts usually comprise a metallic component engineered for maximum stiffness with recesses at the ends for the insertion of elastomeric elements for receiving the securing means. The main task of these pendulum mounts is, in addition to handling peak forces, to isolate the mounting point. For this purpose pliant elastomeric members find special use which translate from a defined linear excursion into a progression in stiffening the mounting point statically and/or dynamically. Thus, the acoustical isolation is drastically reduced.

DE 19631893 A1 describes a pendulum mount of the afoementioned kind in which the supporting arm is arranged between two housings, one of which is joined to the supporting arm and comprising an inner opening into which an inner sleeve is inserted supported by an elastomeric member in the housing. The elastomeric member is vulcanized in place in the housing in a material positive connection.

DE 4 441 219 C2 shows a plastics pendulum mount made up of two separate parts, at least one of which is configured dished so that, when assembled, a closed hollow profile is formed. The parts are joined together particularly by bonding, welding or by positive connection.

Described in EP 0 849 491 A2 is a pendulum mount, the base body of which is formed by two parts arranged opposite each other and joined together by being vulcanized in place. Configured on the base body are housings on each of which an inner sleeve is elastically mounted by means of an elastomeric member.

In the pendulum mounts as described above the pliancy and (spring) excursion space between the mounting points is relatively small.

SUMMARY OF THE INVENTION

It is against this background that the object of the invention is to define a pendulum mount for maximizing the excursion space whilst permitting cost-effective production.

To achieve the cited object it is proposed in a pendulum mount of the afoementioned kind that the base body comprises two base body elements, that the base body elements are joined via at least one elastic thrust element and that at least one of the base body elements comprises a recess in which a portion of the other base body element is located with space for excursion.

The pendulum mount in accordance with the invention now makes it possible to achieve a large excursion of each base body element to the other. The invention is based on having discovered that by providing a thrust element the base body is elastically configured in enabling larger spring excursions to be achieved. In this arrangement the thrust element comprises a sufficiently large base surface area and height configured in accordance with the desired spring excursion and the desired stiffness. The pendulum mount in accordance with the invention is characterized by a low profile and cost-effective production.

Advantageous aspects of the pendulum mount read from the sub-claims.

Advantageously, the portion incorporated in the recess is configured as a housing to receive the securing means.

In one advantageous aspect of the invention the base body element comprises a substantially flat base surface area from which the receiving housing protrudes perpendicularly.

In another advantageous aspect of the invention the base body elements are configured identical to achieve low production costs.

Advantageously, each base body element comprises a recess in which a portion of the opposite base body element is located with an excursion space. The excursion space is obtained by an excursion space provided between the located portion and the edge of the recess. Via this excursion space the excursion of the other base body element is adjustable. The recesses can be varied in size as a function of the application requirements, i.e. a large recess creating for the opposite base body element a large excursion space so that the two base body elements are permitted maximum excursion, each relative to the other, whereas with a small recess the excursion space is very small and excursion of the two base body elements is greatly restricted relative to each other.

In yet another aspect of the invention an angular abutment of the base body element is provided in the region of the recess, this angular abutment forming a stop for the opposite base body element.

In accordance with an advantageous embodiment the thrust element and a supporting member for elastically supporting the securing means are configured on a molded vulcanized member of an elastic material. This enables the two base body elements to be joined to each other via the thrust element and an elastic securing of the securing means by the supporting members in the receiving housings, all in one single vulcanization procedure This simple configuration of the two base body elements now makes it possible to produce the base body elements by means of a deep drawing technique for cost-effective production of the base body elements, production being particularly cost-effective when using identical base body elements.

In still another advantageous aspect of the invention a hollow cylindrical sleeve is inserted in the receiving housing of the base body element serving as a securing means and supported by the elastic supporting member in the receiving housing.

Advantageously, the base body elements are potted in a sheathing of elastic material, serving to protect from corrosion.

BRIEF DESCRIPTION OF THE DRAWINGS

The invention will now be detained by way of example aspects as shown diagrammatically in the drawings in which:

FIG. 1 is a vertical section through a first embodiment of a pendulum mount in accordance with the invention;

FIG. 2 is a view from above of the pendulum mount in accordance with the invention as shown in FIG. 1;

FIG. 3 is vertical section through an alternative aspect of a pendulum mount in accordance with the invention;

FIG. 4 is a view in the direction of the arrow IV of the pendulum mount as shown in FIG. 3.

DESCRIPTION OF THE PREFERRED EMBODIMENTS

Referring now to FIG. 1 there is illustrated a pendulum mount 10 in accordance with the invention formed by a base body 12 comprising two securing means 11. The base body 12 is made up of two base body elements 12a, 12b each configured identical as a dish, arranged opposite each other. The base body elements 12a and 12b comprise substantially flat rectangular base surface areas 16. Vulcanized in place between the opposite base body elements 12a, 12b is an elastomeric thrust element with a large surface area. Each base body element 12a, 12b contains a receiving housing 13 extending perpendicular to the flat base surface areas 16. The securing means 11 are inserted into the receiving housing 13, each securing means 11 being supported by an elastic supporting member 14a, 14b in the base body elements 12a, 12b. The securing means 11 are configured as hollow cylindrical bushes and serve to fasten two bodies, each movable relative to the other which may be an engine, on the one hand, and the body of the vehicle, on the other. Furthermore, each of the base body elements 12a, 12b comprises a recess 17 into which the opposite base body element 12a, 12b engages with the securing means 11 mounted therein. The recess 17 and the engaging receiving housing 13 of the opposite base body element each form an excursion space 18 which can be dimensioned as large as is required by the range of application. To limit the horizontal excursion of the base body elements 12a, 12b an angular abutment 19 is provided at the base body element 12a, 12b in the region of the recess 17. This angular abutment 19 serves as a stop for the receiving housing 13 on horizontal excursion. The base body 12 is potted by am elastomeric sheathing 20 for the purpose of corrosion protection. It is possible to produce the elastic supporting members 14, thrust element 15 as well as the sheathing 20 of the base body elements 12a, 12b all in a single vulcanization procedure.

Referring now to FIG. 2 there is illustrated a view from above of the pendulum mount as shown in FIG. 1, illustrating the recesses 17 in which the receiving housings 13 protruding up/down into the recesses 17 with the securing means 11 fastened thereto are evident. Each recess 17 permits movement of the receiving housing 13 of the opposite base body element 12a, 12b in both dimensions in the horizontal plane. It is obvious from both FIG. 1 and FIG. 2 that the base body elements 12a and 12b are configured identical to make for low production costs.

By configuring the pendulum mount split, the base body elements can be deep drawn from sheet metal, again to make for low production costs.

Referring now to FIG. 3 there is illustrated an alternative aspect of a pendulum mount 10 in accordance with the invention. This pendulum mount 10 comprises a base body 12 featuring substantially flat base surface areas 16 and consisting of two base body elements 12a and 12b arranged opposite each other, which in this example aspect are not configured identical, however. In this example aspect an angular abutment 19 is provided only in the base body element 12b arranged as the lower of the two, serving as a stop for the receiving housing 13 of the opposite upper base body element 12a.

Referring now to FIG. 4 there is illustrated a pendulum mount as shown in FIG. 3 in a view in the direction of the arrow IV. The base body elements 12a, 12b comprise a slanting outer contour as may be called for by the design of the mounting space in the vehicle.

As illustrated in both FIG. 1 and FIG. 3 the base body elements 12a and 12b are potted by a sheathing 20 for comprehensive corrosion protection of the pendulum mount 10.

The split configuration of the pendulum mount 10 with the two opposite base body elements 12a, 12b maximizes the excursion of the two base body elements 12a, 12b with the securing means 11 fastened therein in the form of bushes. Such a large horizontal excursion is made possible by the thrust element 15 arranged inbetween.

The thrust element 15 is bonded and vulcanized in place over a large surface area between the base body elements 12a, 12b. On one side of a base body element 12a, 12b a securing means 11 is held by the elastomeric supporting member 14 whilst at the other side of the base body element 12a, 12b a recess 17 is provided forming the stops for the receiving housing of the opposite base body element 12a, 12b. To reduce the space taken up in this arrangement it is also possible that only one stop portion is configured for a base body element 12a, 12b.

Due to the fully bonded elastomeric structures of the thrust element 15 and supporting members 14 the excursions can be maximized. At the same time, a base body 12 is made possible for the pendulum mount 10 comprising a very low profile, Depending on how the thrust element 15 and securing means 11 are formed by being vulcanized in place, the stiffness can be varied. Due to the shape of the base body elements 12a, 12b a pendulum mount 10 in accordance with the invention is able to accommodate very high forces and torques. By the recesses 17 in each base body element 12a, 12b the maximum travel of the other base body element 12a, 12b in each case is defined by a correspondingly large excursion space.

Varying the bonding surface area of the thrust element 15 at the base body elements 12a, 12b determines the stiffness of the pendulum mount in that the larger the bonding surface area between the receiving housing 13, the higher the stiffness for a comparatively low Shore hardness. Since the recess 17 can be configured optionally the excursion spaces of the stop of the other base body element 12a, 12b in each case are optionally adjustable.

LIST OF REFERENCE SIGNS 10 pendulum mount
11 securing means
12 base body
12a furst base body element
12b second base body element
13 receiving housing
14a,b supporting member
15 thrust element
16 flat base surface area
17 recess
18 excursion space
19 angled abutment
20 sheathing

We claim:

1. A pendulum mount, comprising:
first and second, mutually spaced-apart means for joining two bodies movable relative to one another;
a base body formed with first and second base body elements;
at least one thrust element joining said first and second base body elements to one another;
at least said first base body element being formed with a recess and a portion of said second base body element is incorporated in said recess with freedom of excursion;
said portion incorporated in said recess being a housing receiving one of said first and second means for joining, each of said means for joining being supported by an elastic supporting member, said second base body element having a substantially flat base surface area with said housing projecting from said base surface area perpendicularly, and said recess and said housing define an excursion space delimiting the freedom of excursion, the horizontal excursion of the housing within the recess being limited during use by a stop formed in the wall of the recess; and wherein said base body elements are deep drawn parts of sheet metal.

2. The pendulum mount according to claim 1, wherein said first and second means for joining are configured for mounting an engine assembly.

3. The pendulum mount according to claim 1, wherein said first and second base body elements are substantially identical.

4. The pendulum mount according to claim 1, wherein said second base body element is additionally formed with a second base body recess and a portion of said first base body element is incorporated in said second base body recess with freedom of excursion.

5. The pendulum mount according to claim 1, which comprises an angular abutment formed in a region of said recess of said first base body element, said angular abutment forming a stop for said second base body element.

6. A pendulum mount, comprising:
first and second, mutually spaced-apart means for joining two bodies movable relative to one another;
a base body formed with first and second base body elements;
at least one thrust element joining said first and second base body elements to one another;
at least said first base body element being formed with a recess and a portion of said second base body element is incorporated in said recess with freedom of excursion;
said portion incorporated in said recess being a housing receiving one of said first and second means for joining, each of said means for joining being supported by an elastic supporting member, said second base body element having a substantially flat base surface area with said housing projecting from said base surface area perpendicularly, and said recess and said housing define an excursion space delimiting the freedom of excursion, the horizontal excursion of the housing within the recess being limited during use by a stop formed in the wall of the recess; and
wherein said at least one thrust element and at least one of said elastic supporting members for elastically supporting said means for joining are configured as part of a molded vulcanized member of elastic material.

7. The pendulum mount according to claim 1, wherein said means for joining are hollow cylindrical sleeves.

8. A pendulum mount, comprising:
first and second, mutually spaced-apart means for joining two bodies movable relative to one another;
a base body formed with first and second base body elements;
at least one thrust element joining said first and second base body elements to one another;
at least said first base body element being formed with a recess and a portion of said second base body element is incorporated in said recess with freedom of excursion;
said portion incorporated in said recess being a housing receiving one of said first and second means for joining, each of said means for joining being supported by an elastic supporting member, said second base body element having a substantially flat base surface area with said housing projecting from said base surface area perpendicularly, and said recess and said housing define an excursion space delimiting the freedom of excursion, the horizontal excursion of the housing within the recess being limited during use by a stop formed in the wall of the recess; and
which comprises an elastic material sheathing encasing said base body elements.

* * * * *